Fig. 3. Inventors.
Joseph Pacy Cleal
Robert Enon Awde
by H. J. S. Dennison atty.

UNITED STATES PATENT OFFICE.

JOSEPH PACY CLEAL AND ROBERT ENON AWDE, OF TORONTO, ONTARIO, CANADA.

LOCK.

1,396,163.  Specification of Letters Patent.  Patented Nov. 8, 1921.

Application filed February 28, 1920. Serial No. 362,197.

*To all whom it may concern:*

Be it known that we, JOSEPH PACY CLEAL and ROBERT ENON AWDE, both subjects of the King of Great Britain, and residents of the city of Toronto, county of York, Province of Ontario, in the Dominion of Canada, have invented certain new and useful Improvements in Locks, described in the following specification and illustrated in the accompanying drawings, that form part of the same.

The principal objects of this invention are, to provide a lock for sliding doors which will lock automatically upon the closing of the door, holding the door very securely against being forced open by unauthorized persons, and to devise a structure of simple, strong and durable form which will withstand the rough usage to which such locks are subjected.

The principal feature of the invention consists in the novel construction and arrangement of parts, whereby a recessed fastening bolt is adapted to enter the lock and to engage and rotate a pivotal member to enter the recess and whereby said pivotal member is locked in engagement with said tongue.

A further important feature consists in the novel construction and arrangement of the locking tongue upon a lever member whereby the tongue is housed within a recess and pressure against the end of the lever by the closing of the door swings the lever to project the tongue into the lock.

In the drawings, Figure 1 is a sectional perspective view of the lock in the unlocked position.

Fig. 3 is an elevational part sectional view.

Figure 1:
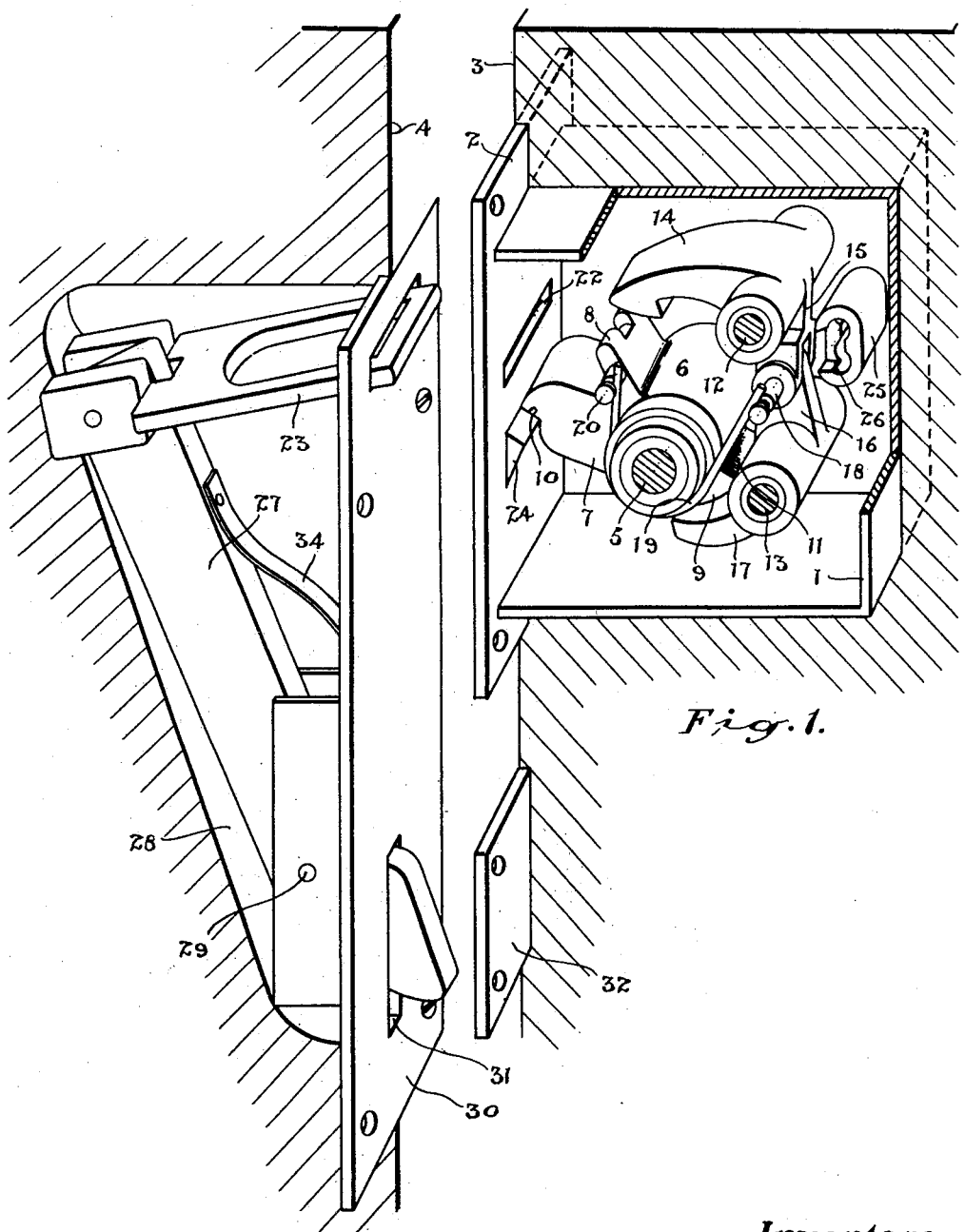
Figure 2:
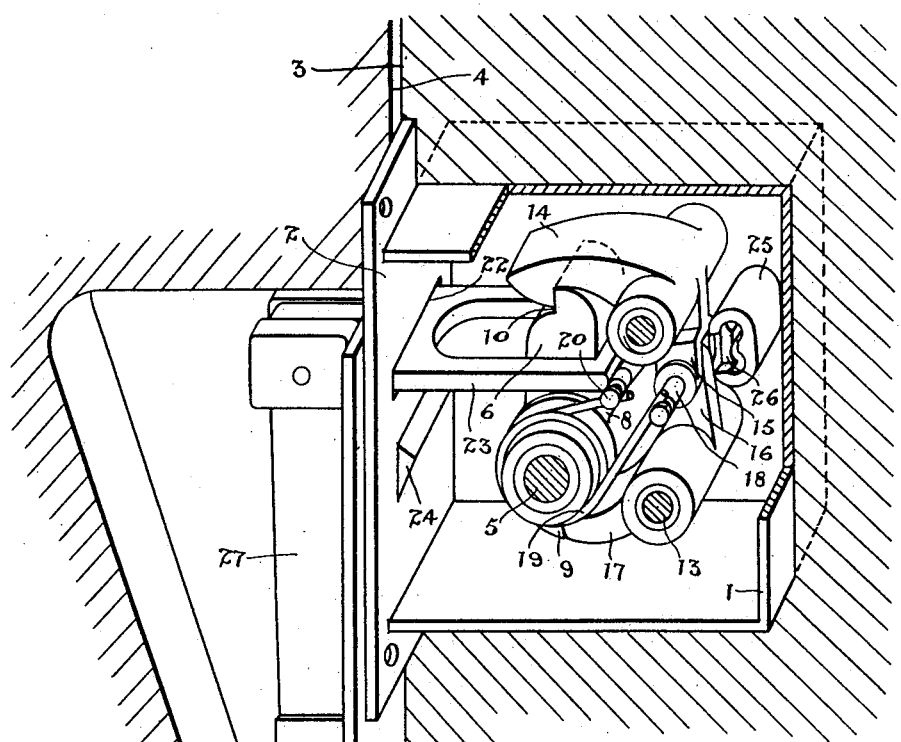
Fig. 2 is a sectional perspective view showing the parts in the locked position.

Referring to the drawings, the lock 1 is arranged either in the door or the door casing as may be desired, the face plate 2 being flush with the edge 3 which is adapted to abut the adjacent edge 4 of the frame of the door as the case may be.

Within the casing 1 is arranged a pin 5 which extends between the sides thereof and upon this pin is pivoted the locking member 6 which member is formed with the lug projections 7, 8 and 9.

The lugs 7 and 8 are arranged within an acute angular relationship the one to the other, meeting at their basis, the lug 8 being to the rearward side of the lug 7 for a purpose which will hereinafter appear. The outer end of the lug 7 is notched presenting a radial surface 10 and the lug 9 is arranged diametrically opposite to the lug 7 and presents a radial surface 11.

A pair of pins 12 and 13 are secured between the side plates of the lock casing and upon the upper pin 12 is pivotally mounted a latch member 14 which is in the form of a hook and is adapted to engage the radial surface 10 of the lug 7 and to lock the same when in engagement therewith.

A jaw lug 15 projects downwardly from the hub and the latch member 14 and this jaw lug is pivotally connected with a lug 16 of a pivotal dog 17 mounted upon the pin 13, said dog being adapted to engage in locking contact with the radial surface of the lug projection 9 when the latch member 14 is in locking engagement with the lug 7.

The pin 18 connecting the jaw lug and lug 16 projects from one side of the jaw lug and is engaged by one end of the spring wire 19 which encircles the hub of the member 6, the other end engaging a pin 20 projecting from the lug 7. The tendency of this spring is to rotate the member 6 on its pivot to move the lug 7 away from the latch 14 and the lug 9 toward the dog 17 and the opposite end of the spring exerting an outward pressure against the pin 18 holds the latch 14 and dog 17 in engagement with the lugs 7 and 9 respectively and the upper surface of the dog 17 engages the curved under surface of the lug 9, the spring pressing outwardly upon the pin connecting the two dog members so that when the lower dog slips into place the upper latch member is swung downwardly.

In the front plate 21 of the lock is arranged a slot 22 through which the fastening tongue or bolt 23 enters and below the slot is arranged a projecting stop 24 against which the radial surface 10 of the lug 7 rests when the lock is released.

A boss 25 is formed in the casing 1 and extends to the outward side of the pivotally connected ends of the latch 14 and dog 17 and in this boss is formed a recess 26 to receive a key. The recess may be shaped as desired with suitable wards to insure the use of a proper key but when the proper key is used the plate thereof swings inwardly and engages the pivotally connected ends of the latch and dog and presses them inwardly swinging them upon their pivots to release the locking member 6 and immediately upon said release the spring 19 rotates the member 6 on its pivot, thus withdrawing the locking member from engagement with the bolt.

The action of the lock is that as the door is closed the bolt 23 enters the slot 22 and the end thereof engaging the lug 8 swings the member 6 upon its pivot, thus bringing the member 7 through the slot or recess in the bolt and as the lug 9 rotates clear past the end of the dog 17, said dog swings into position to interlock therewith and through the pin connection 18 it swings the latch 14 downwardly to engage the latch surface 10 of the lug 7. The member 6 is thus locked securely against rotation both at the top and bottom and it will require a pressure sufficient to break the bolt 23 before the door can be opened. The proper key however will upon being inserted swing the locking dogs upon their pivots to release the locking members 6 and the bolt is then free to be removed. This bolt member may be fastened solid to the door or to the door frame as may be desired, but it is preferable that such bolt should not project from the door or frame such a distance as is required for locking when the door is not closed as it would be dangerous to persons passing through the doorway.

In order to eliminate this danger the bolt tongue 23 is pivotally supported upon a lever 27 arranged within a recess 28 in the door or door frame and the lever is mounted upon a pivot 29 which is carried in suitable supports from the face plate 30.

The lower end of the lever 27 is curved outwardly and extends through a slot 31 in the lower end of the plate and projects beyond the same a short distance.

A plate 32 is arranged upon the opposing member adapted to engage the lower end of this lever 27 and as the door is closed the lever is swung upon its pivot to throw the bolt tongue outwardly through the upper slot 33 and into the locking device hereinbefore described. The lever 27 is provided with a flat leaf spring 34 which normally holds the tongue in the receded position.

A lock such as described is extremely strong and simple and will stand an enormous amount of ill usage without getting out of order. It is very positive and will lock the door securely against force. The form of key lock herein shown is of the simplest kind but it will be understood that any form of key lock may be applied thereto without interfering with the elements of the invention.

The lock bolt is here shown as formed with a slot to receive the locking member 7 but the structure of the bolt may be varied considerably as may also the detailed construction of many of the parts without departing from the spirit of the invention.

What we claim as our invention is:—

1. A lock, comprising, a casing having a slot in one side thereof, a slotted bolt adapted to enter the slot in said casing, a rotatable member adapted to be engaged and rotated by said bolt and having a lug adapted to be engaged and rotated by said bolt and having a lug adapted upon rotation to extend through the slot, a bell crank latch member adapted to engage said lug when extending through said bolt, a bell crank dog pivotally connected to said latch member, a lug projection on said rotatable member adapted to engage said dog when in its locked position, spring means for holding the pivotal connection of said latch and dog in a break joint position, and key means for breaking said joint to swing said latch and dog clear of the rotatable member to effect the release of the lock bolt.

2. In a sliding door lock, a recessed bolt arranged in one of the door members, a lock casing arranged in the other door member having a slot adapted to receive said bolt, a rotatable member in said lock casing having a pair of transversely arranged lug projections, one of said lugs being adapted to extend through the recess in the bolt, a pair of pivotal members adapted to engage said lugs in locking contact, and means connecting said pair of pivotal members adapted to effect their operation in unison to move inwardly to engage and lock said rotatable member and to move outwardly to release said rotatable member.

3. A sliding door lock, comprising, a slotted casing, a rotatable member arranged within said casing and having a projecting radial lug, a bolt adapted to engage said radial lug upon insertion through the slot in the casing; a pivotal latch member adapted to engage and lock said lug in engagement with said bolt, a spring member adapted to rotate said bolt locking member to clear the bolt and also engaging the pivotal latch member to hold it in engagement with the rotatable bolt locking member, and a key means for turning said latch to effect its release from the bolt locking means.

JOSEPH PACY CLEAL.
ROBERT ENON AWDE.